Figure 5:
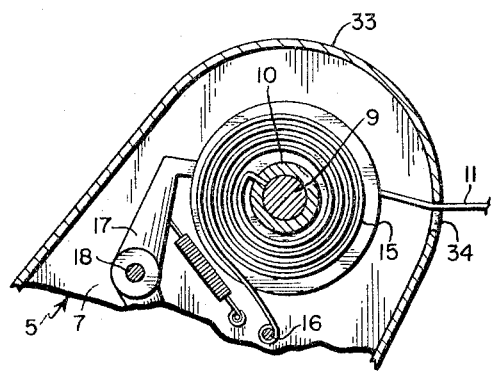

Dec. 27, 1966   J. G. FONTAINE   3,294,446
CONTROLLING MEANS FOR VEHICLE SEAT BELTS
Filed Jan. 5, 1965   2 Sheets-Sheet 1
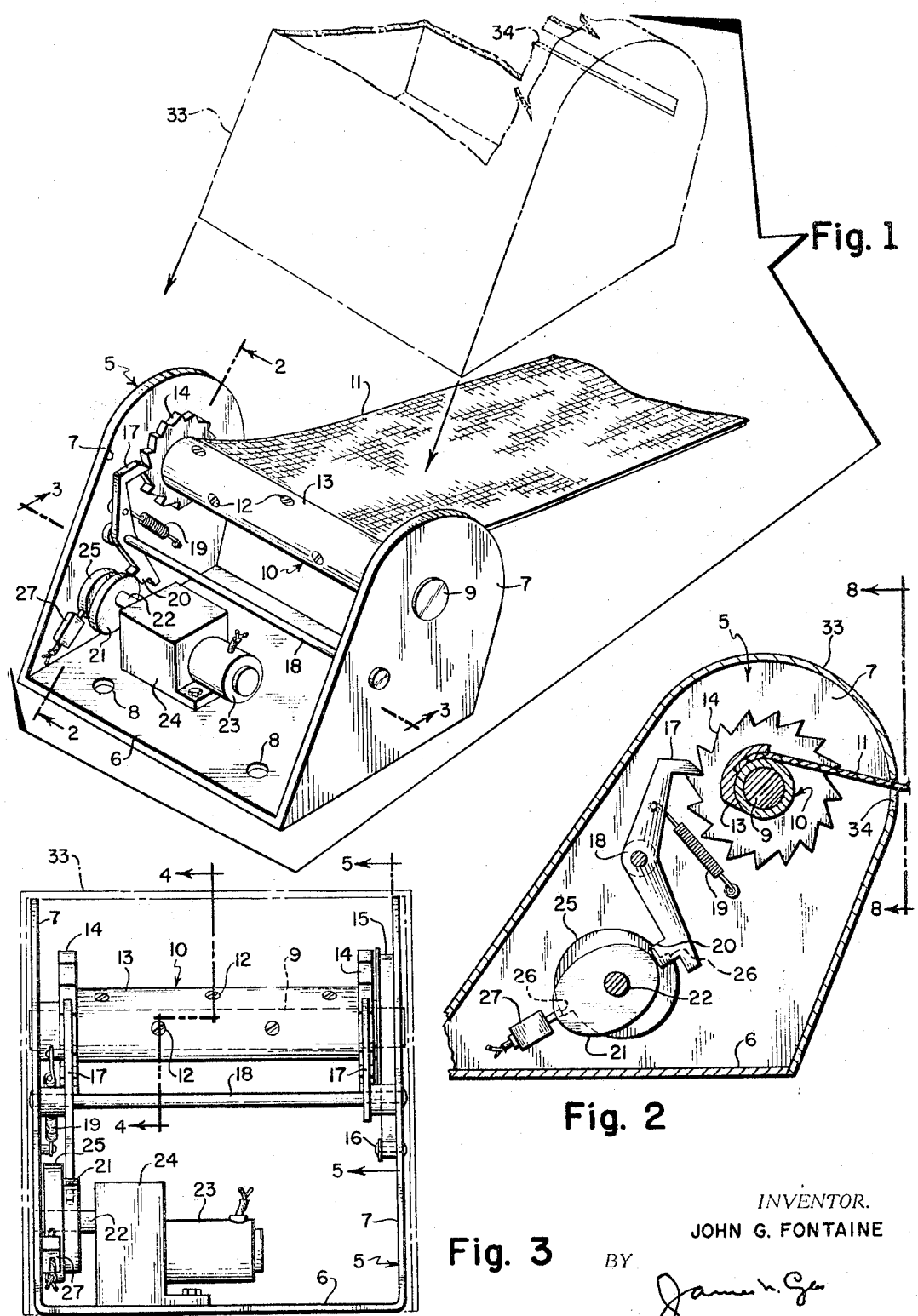
INVENTOR.
JOHN G. FONTAINE
BY
*James H. Ger*
ATTORNEY Dec. 27, 1966     J. G. FONTAINE     3,294,446
CONTROLLING MEANS FOR VEHICLE SEAT BELTS
Filed Jan. 5, 1965     2 Sheets-Sheet 2

INVENTOR.
JOHN G. FONTAINE
BY
ATTORNEY

United States Patent Office 3,294,446
Patented Dec. 27, 1966

3,294,446
CONTROLLING MEANS FOR VEHICLE
SEAT BELTS
John G. Fontaine, 2817 NE. 26th Court,
Fort Lauderdale, Fla. 33311
Filed Jan. 5, 1965, Ser. No. 423,416
4 Claims. (Cl. 297—388)

This invention relates to a feed and rewinding device for automobile seat belts and whereby the belts are fed outwardly by the driver or a passenger in the vehicle and locked into a predetermined position after the belt section has been fed out a predetermined distance.

The device embodies a feeding and locking mechanism that is anchored preferably to the floor of the vehicle adjacent each end of the seat and whereby a belt section may be pulled outwardly to engage a companion belt section to protect the driver or passenger against injury should the vehicle be suddenly stopped or accidentally engaged in a collision with another vehicle or an immovable object.

The invention comprises a frame that is anchored to the floor of the vehicle and with the frame carrying a roller upon which the belt section is wound or unwound and means carried by the roller at its opposite ends for locking the roller in a predetermined position against further extension of the belt and electrically controlled means for actuating the locking mechanism that is controlled by a push button that is located in a position convenient to the driver or the passenger.

Novel features of construction and operation of the device will be more apparent during the course of the following description reference being had to the accompanying drawings wherein has been illustrated a preferred form of the device and wherein like characters of reference are employed to denote like parts throughout the several figures.

Figure 4:
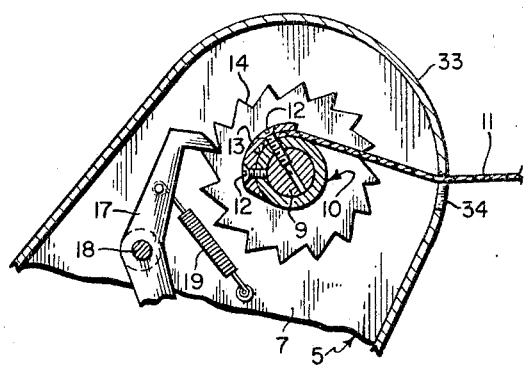
Figure 6:
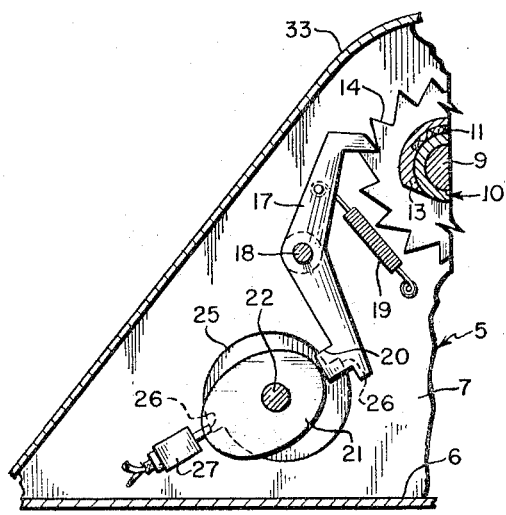
Figure 7:
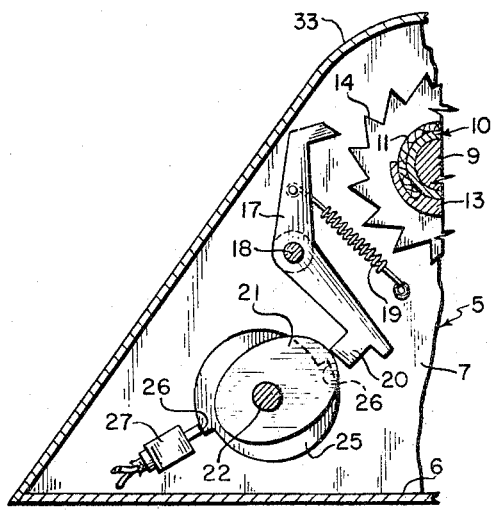
Figure 9:
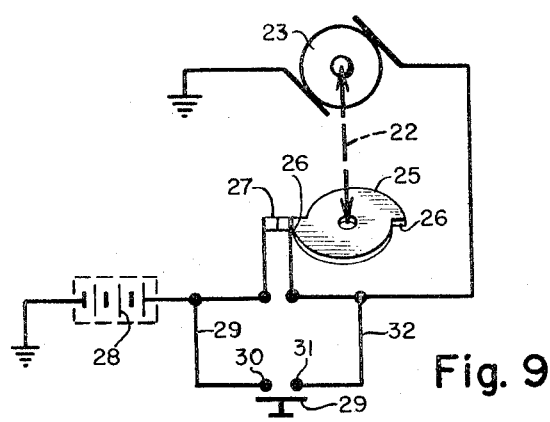
Figure 8:
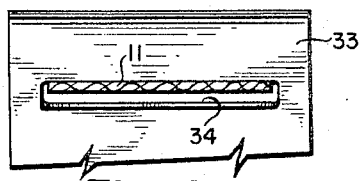

In the drawings:

FIGURE 1 is a perspective view of a device constructed in accordance with the invention, parts being shown in dotted lines, FIGURE 2 is a sectional view taken substantially on line 2—2 of FIGURE 1, FIGURE 3 is a section taken substantially on line 3—3 of FIGURE 1 and looking in the direction of the arrows, FIGURE 4 is a fragmentary cross sectional view through a winding roller, taken on line 4—4 of FIGURE 3, FIGURE 5 is a section taken substantially on line 5—5 of FIGURE 3 and illustrating a winding spring, FIGURE 6 is a fragmentary sectional view taken substantially on line 6—6 of FIGURE 1 illustrating a locking pawl, FIGURE 7 is a similar view showing the pawl in a release position, FIGURE 8 is a sectional view taken substantially on line 8—8 of FIGURE 2, and FIGURE 9 is a diagrammatic illustration of a circuit for controlling the winding and unwinding of a seat belt.

Referring specifically to the drawings, there has been illustrated a U-shaped frame 5, having a bottom 6 and upstanding end walls 7. The bottom 6 is apertured at 8 to receive fastening screws or the like whereby the frame is anchored to a floor area of the vehicle at opposite ends of the seat. Journalled within the ends 7, is a shaft 9, carrying winding roller 10. Anchored to the roller 10, is a seat belt 11, clamped to the roller by screws 12, passing through a clamping plate 13. One screw 12 passes through the plate 13, the belt 11 and functions to anchor the roller 10 to the shaft 9.

Fixed to the opposite ends of the roller 10 are ratchets 14 and, between one ratchet 14 and the adjacent end wall 7, is a winding spring 15, shown particularly in FIGURE 5 and with one end of the spring 15 being fixed to the roller 10 and its opposite end being anchored at 16 to the adjacent end wall 7 and with the spring 15 being biased in a direction to wind the belt 11 upon the roller 10.

Adapted to engage each of the ratchets 14 upon opposite sides of the frame 5, are pawls 17 that are fixed to a cross shaft 18, having its ends journalled in the side walls 7 and whereby the pawls are rockable to and from engagement with the ratchets 14. The pawls 17 are normally biased in a locking direction with the ratchet 14 by coil springs 19. Each of the pawls 17 adjacent their lower ends are provided with forwardly extending lugs 20 that are engaged by a cam 21 and whereby the movement of the pawls under the influence of the cam 21 functions to move the pawls from their locking engagement with the ratchets 14. The cam 21 is fixed upon a drive shaft 22 and the shaft 22 is driven by an electric motor 23 that is fixed to the bottom 6 of the frame and disposed between the motor and the shaft 22 is a reduction gearing 24 whereby the shaft 22 is driven at a reduced speed to control the movement of the cam 21. Mounted alongside the cam 21, is a second cam 25, having double faces 26 for controlling a micro-switch 27. The micro-switch 27 and its actuating cam 25 is illustrated in the diagrammatic circuit shown in FIGURE 9.

In FIGURE 9 there has been illustrated the circuit for controlling the motor 23 and the shaft 22 to rotate the cams 21 and 25. In the diagrammatic circuit, there has been illustrated a source of energy illustrated at 28 and a push button switch 29, located either upon the floor area in certain vehicles or upon the instrument panel that is convenient to the reach of the driver or the passenger and a conductor from the positive side of the source of the energy 28 illustrated at 29, passes to one pole 30 of the switch and the opposite pole 31 of the switch is connected to a conductor 32 that leads to the micro-switch 27 and the motor 23 and the source of energy and the motor are suitably grounded, as illustrated.

Adapted to engage over the frame 5, is a cover plate 33, shaped to conform to the end plates 7 and the cover plate 33 upon its forward side is slotted at 34 for the passage of the belt 11. The cover plate 33 in assembled relation is fixed to the frame 5 by screws or other fastening devices, not shown.

In the use of the device when a belt section 11 is to be engaged with the body of the user and to have coupling engagement with a companion belt section by the usual buckles, the operator pulls upon the free end of the belt section 11 and extends it forwardly from the roller 10 and against the tension of the spring 15 and when the belt section has been extended the required distance to permit its buckle to be engaged with the buckles of a companion belt section and with the buckles being engaged, the push button 29 is then momentarily pressed, causing the motor 23 to rotate the cam 21, causing a half revolution of the cam to release the pawls 17, and permitting the springs 19 to swing the pawls to a locking engagement with the ratchets 14, preventing further extension of the belt and to securely hold the belt around the body of the person against further extension. Under normal circumstances, the pawls 17 are in a release position, such as illustrated in FIGURE 7. After the belt has been extended, the button 29 is momentarily actuated, causing the motor 23 to make substantially ½ revolution and to permit the springs 19 to lock the pawls with the ratchets and to prevent further extension of the belt. The power of the springs 19 is greater than the power of the spring 15 and the pawls are always biased toward the ratchets and only released from the ratchets by the cam 21. The switch 29 only requires that the operator press the switch inwardly to bridge the contacts 30 and 31 and the switch 29 is momentarily biased outwardly in a conventional manner and since the cam 25 is fixed to the shaft 22 and rotates simultaneously with the cam 21, one-half revolution of the shaft 22 by the reduction gearing 24 controls the movement of the pawls and the micro-switch 27 and, when the pawls are in the locked position with respect to the ratchets 14 under the influence of the springs 19, the belt 11 will be held against retraction or further extension and, it will be apparent, that the single revolution of the shaft 22, as shown in FIGURE 7 functions to rotate the cams 21 and 25 so that, upon pressing the switch 29, the pawls are actuated first to the release position and then the switch 29, controlled by the cam 25 causes the pawls to be released for engagement with the ratchets 14, locking the roller 10 against further extension of the belt. The belt is released by again engaging the switch 29, causing the cams 21 and 25 to again rotate a half revolution, moving the pawls 17 to the release position shown in FIGURE 7 and in this position, the spring 15 biases the belt to rewinding position upon the roller 10 and will remain in such position until the belt is to be again actuated for engaging the body of the user. The cam 25 having the double actuating faces 26, causes the micro-switch to be energized and deenergized for each half rotation of the shaft 22 and each rotation of the shaft 22 also causes the pawls 17 to be alternately engaged and disengaged with the ratchets 14. Normally the pawls 17 are in the release position with respect to the ratchets before and after the belt has been extended or retracted. With the ratchets being released, the operator extends the belt and then trips the switch 29, causing the motor 23 to rotate the cams one-half revolution, causing the pawls to be released and to be biased to engagement with the ratchets, preventing further extension of the belt and also to prevent retraction of the belt. The belt is of course extended from the roller 10 a distance capable of permitting the engagement of the buckles and the switch 29 then actuated, to permit the pawls to be biased to locking engagement with respect to the ratchets and the belt is then securely held until such time as the belt is to be retracted upon the roller 10 and when this is desired, the switch 29 is again actuated, causing the half revolution of the cams 21 and 25, forcing the pawls away from the ratchets against the tension of the spring 19 at which time, the belt is again rolled upon the roller 10 by the spring 15. With the belt fully retracted, the pawls remain in the release position for a further extension of the belt and the belt is free to be again extended and, after the belt has been extended, the switch 29 is activated, causing the cams to again rotate a half revolution, releasing the pawls to the locking position with respect to the ratchets and to lock the roller against further movement to prevent further extension or retraction of the belt. While a motor 23 has been employed to rotate the cams for movement of the pawls and the micro-switch 27, other means may be employed to control the movement of the pawls and/or the micro-switch 27 such as solenoid magnets or any mechanical means operable by the operator functioning to move the cams or the pawls and of course the invention is not restricted to the use of a motor such as illustrated in the application.

It will be apparent from the foregoing that there has been illustrated a very novel and desirable means for controlling the feeding and retraction of those belt sections of a conventional seat belt that normally are located adjacent to the ends of the vehicle seat and so that the belt sections 11 on either side may be controlled by the switch 29 and a manual pulling upon the belt 11. The drive motor 23 is energized to rotate the cams 21 and 25 at a relatively low speed and, since the cams are in the release position initially, the operator is free to pull the belt outwardly against the tension of the spring 15 to the desired position and, after the belt has been extended, the operator merely actuates the switch 29, causing the cams 21 and 25 to rotate substantially one-half revolution, releasing the pawls for locking engagement with the ratchets and to simultaneously control the micro-switch. The device is simple in construction, is strong, durable, cheap to manufacture and most effective for controlling the movement of the particular belt sections and after use, the belt sections are retracted upon the roller 10 by the spring 15. The reduction gearing 24 may of course be of any desirable construction for controlling the rotative movement from the motor shaft and the reduction gearing has not been illustrated in detail since reduction gearings are basically old.

It is to be understood that the invention is not limited to the precise construction shown, but that changes are contemplated as readily fall within the spirit of the invention as shall be determined by the scope of the subjoined claims.

Having described my invention what I claim as new and desire to secure by Letters Patent is:

1. Control means for vehicle seat belt sections that are adapted to have companion engagement with seat belt sections in a vehicle seat that comprises a rigid U-shaped frame, having a flat bottom and upstanding side walls, the bottom being anchored to a floor area of the vehicle at each end of the seat, a cover that is adapted to overlie the frame and to be fixed thereto, the cover in a forward wall being slotted to receive a seat belt section, the frame being provided with a winding drum that is journaled in the end walls of the frame, the seat belt at its inner terminal end being fixed to the drum, a winding spring fixed upon the drum at one end whereby to bias the drum in a direction to wind the seat belt thereon, the winding drum at each end being provided with ratchets, pawls for engaging the ratchets and with the pawls being anchored upon a cross shaft that extends across the frame and with the pawls being biased in one direction to engage the ratchets by spring devices, a drive motor fixed upon the bottom of the U-shaped frame and having the slot in its forward wall to a shaft that is journaled in one side wall of the frame, the shaft having fixed thereon a cam that engages one of the pawls and in one position of the cam, the pawls are released from the ratchets and in a different position of the cam, the pawls are biased to engage the teeth of the ratchet to lock the drum and the seat belt in a predetermined position of extension, a second cam fixed upon the shaft of the motor for actuating a micro-switch that is fixed to one side wall of the frame and with the last named cam controlling the micro-switch to energize the motor and a push button that is disposed in a position adjacent to the seat of the vehicle whereby to actuate the motor and the micro-switch to control the motor for a predetermined number of rotations whereby the actuation of the push-button releases the pawls with respect to the ratchets to permit the seat belt section to be extended for coupling engagement with a companion seat belt section carried by the vehicle seat.

2. The structure according to claim 1 wherein the rotation of the shaft carrying the cams is through the medium of a reduction gearing.

3. The structure according to claim 1 wherein the winding drum is rotatable upon a cross shaft that is journaled in the end walls of the frame, the belt section being connected to the drum by an overlying plate and screws extending through the plate and through the drum and into the shaft for locking the terminal end of the belt to the drum and to fix the drum with respect to the shaft.

4. The structure according to claim 1 wherein one of the pawls extend downwardly from its supporting shaft and provided with a forwardly extending lug that is biased in a direction toward the first named cam, the second named cam being double acting and to control the micro-switch upon each half revolution of the cam, the said cover for the frame overlying the side walls and the bottom of the U-shaped frame and having the slot in its forward wall whereby the belt section may be extended from the drum when the first named cam is actuated to release the pawls from the ratchets and to permit the pawls to again have locking engagement with the ratchets when the first named cam has made a complete revolution, the winding spring at its inner end being fixed to the drum and its opposite end anchored to an adjacent side wall whereby actuation of the push button will release the pawls from the ratchets and to permit a rewinding of the belt section upon the drum.

References Cited by the Examiner

UNITED STATES PATENTS

| | | | |
|---|---|---|---|
| 2,825,581 | 3/1958 | Knight | 280—150 |
| 2,883,123 | 4/1959 | Finnigan | 242—107.4 |
| 3,174,704 | 3/1965 | Replogle | 242—107.4 |
| 3,193,327 | 7/1965 | Roe | 297—388 |

FRANK B. SHERRY, *Primary Examiner.*

CASMIR A. NUNBERG, *Examiner.*